Nov. 23, 1937.   H. KREBS   2,100,057
VALVE SPRING
Filed Feb. 24, 1934
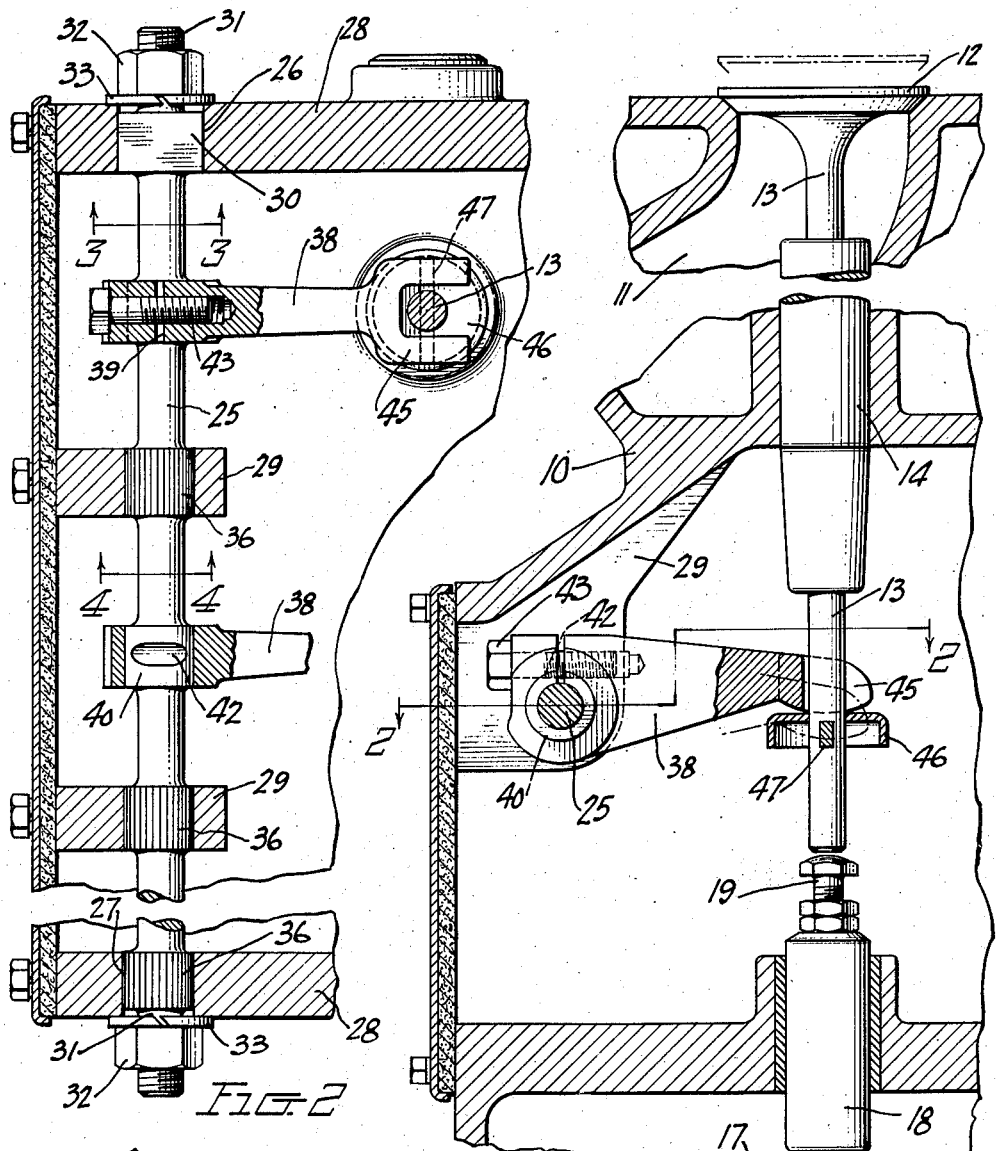
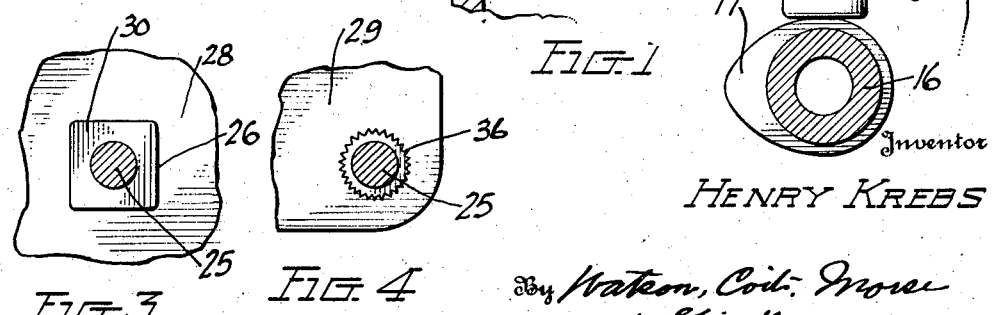
Inventor
HENRY KREBS
By Watson, Coit, Morse & Grindle.
Attorney Patented Nov. 23, 1937

2,100,057

UNITED STATES PATENT OFFICE 2,100,057

VALVE SPRING

Henry Krebs, Detroit, Mich., assignor to Packard Motor Car Company, Detroit, Mich., a corporation of Michigan Application February 24, 1934, Serial No. 712,823

9 Claims. (Cl. 123—90)

This invention relates to internal combustion engines and more particularly to improvements in the actuating mechanism for the valves of such engines.

As the result of relatively recent improvements in automotive engineering whereby extremely high motor vehicle speeds have become common, various motor troubles have developed by reason of the marked increase in the frequency of induced vibrations. Thus difficulty has been encountered in connection with the coil springs commonly used to seat the poppet valves which control the flow of intake and exhaust gases to and from the engine, these springs not infrequently breaking with consequent annoyance and expense to the vehicle operator. It will be appreciated that when an impulse is imparted to such a coiled valve spring as the valve is opened, the impulse travels the length of the spring and is reflected back. If the natural frequency of the spring is low, one such impulse will not be materially damped before one or more succeeding impulses are imparted to the spring, with the result that the spring is caused to surge, and the relatively violent vibrations to which the spring is subjected eventually cause crystallization of the metal and failure of the spring. This condition can be improved by increasing the frequency of the spring or by reducing the amplitude of the vibrations induced therein, but it is clear that in practice the characteristics of the spring will be controlled largely by the amount of lift which must be imparted to the valve and by the load which must be applied to the spring. Thus if the frequency of a coiled spring is increased by increasing the cross-sectional area of the convolutions or by reducing the number of convolutions, the desired valve lift and spring load cannot be secured.

It is therefore proposed by the present invention to provide yielding means for actuating a valve in one direction which may be constructed to afford a much higher natural frequency than is possible with a coil spring.

More specifically it is the object of the invention to provide yielding means for seating a valve which comprises a torsion member having an arm rigidly secured thereto, the arm being operatively connected to the valve for actuation thereof. In the preferred form of the invention a single straight torsion shaft is utilized for the actuation of a plurality of valves, this shaft being supported at spaced points and having the valve actuating arms secured thereto intermediate these spaced points.

Further objects and features of the invention will be apparent from the following description taken in connection with the accompanying drawing, in which:

Figure 1 is a fragmentary sectional view of an engine block showing the valve chamber and illustrating the application of the invention to a conventional valve and valve actuating means;

Figure 2 is a sectional view taken substantially on the line 2—2 of Figure 1; and Figures 3 and 4 are sections on the lines 3—3 and 4—4, respectively, of Figure 2 illustrating alternative embodiments of the invention.

In order to facilitate description of the invention reference will be made to the embodiment thereof illustrated in the accompanying drawing and specific language will be employed. It will be appreciated, however, that no limitation of the breadth of the invention is thereby intended and that such changes and alterations of the construction shown herein are contemplated as fall within the actual scope of the invention as defined in the claims appended hereto.

It will be observed that the valve illustrated in the drawing and the mechanism for opening the same are of the conventional type. Thus the engine block 10 is shown as provided with gas passages 11 which may serve either to convey a combustible mixture to the associated combustion chambers of the engine or to convey exhaust gas therefrom, each passage being controlled by a valve 12 having a stem 13 which is supported for reciprocation in a sleeve 14. A cam shaft 16 having cam lobes 17 thereon engages and actuates the valve tappets 18, one of which is allocated to each valve, an adjustable abutment 19 in the outer end of the valve tappet contacting with and operating the valve stem 13 to open the passage 11 at the proper time. It will be appreciated that the means thus far described constitutes no essential part of the present invention so far as the details thereof are concerned, the invention being readily applicable to other types of valves and valve actuating mechanism.

A shaft 25, which is preferably circular in cross-section and which may be formed of steel or other metal affording the necessary elasticity, extends transversely of the several valve stems of the engine and is preferably disposed in a plane passing perpendicularly through the valve stems. The shaft 25 may be supported at its ends as indicated at 26 and 27 in the end walls 28 of the valve chamber and at intermediate points in ribs 29 preferably formed integrally with and extending inwardly from the valve chamber wall.

The mode of supporting the shaft 25 may be varied to a considerable extent, it being essential only that the shaft be held against rotation at each point at which it is supported. Thus as shown more particularly in Figure 3, which illustrates the manner in which the shaft is supported at the point 26 in Figure 2, an enlarged portion 30 of rectangular cross section is provided on the shaft, this portion fitting within a correspondingly shaped aperture in the end wall 28 of the valve chamber, the outer end of the shaft being threaded as at 31 to receive a nut 32 and a lock washer 33 to retain the shaft against endwise displacement, a similar construction being provided at the opposite end of the shaft.

In the form of the invention shown in Figure 4, the shaft is illustrated as provided with an enlarged cylindrical portion having teeth or serrations 36 thereon to interlock with corresponding serrations on the supporting member.

Intermediate the points of support of the shaft 25, the latter is provided with arms 38, preferably secured rigidly to the shaft. Thus each arm 38 may be split as indicated at 39 to embrace an enlarged portion 40 of the shaft, the latter being provided with an indentation or recess 42 which is adapted to receive a bolt 43 which is threaded into the arm and serves to clamp the split portion of the arm on the shaft in a manner which will be readily understood.

At its free or outer end each arm 38 is operatively connected to an adjacent valve stem 13, preferably by direct engagement of the arm with the valve stem. Thus the end of the arm 38 may be forked as indicated at 45 to embrace the valve stem and may abut a collar 46 which is retained against axial displacement on the valve stem away from the valve head by means of a key 47 passing through the stem.

In installing the mechanism just described, an initial torsional deflection is applied to the shaft 25 intermediate the points of support therefor in such manner that each arm 38 exerts a predetermined thrust on the collar 46 and thereby on the valve stem to properly seat the valve head 12. In the event the method of supporting the shaft is that shown in Figure 3, this initial set or deformation of the shaft may be assured by proper relative location of the faces of the squared portion 30 of the shaft and of the recess 42 which determines the free angular position of the arm 38 with respect to the shaft. The construction shown in Figure 4 permits some slight adjustment initially or subsequently of the extent of angular deformation of the shaft, the shaft and the support being so engaged as to seat the arm 38 in any desired initial position. Alternatively, the initial torsional stress in the shaft can be adjusted by adopting some other form of connection between the arm 38 and the shaft 25, for instance a type of connection such as that shown in Figure 4 of the drawing whereby that initial angular position of the arm on the shaft (shown in dotted lines in Figure 1) may be selected which will place the shaft, when the arm is operatively engaged with the collar 46, under the desired tension. Again, the tension on the shaft 25 may be regulated by providing for an adjustment of the collar 46 longitudinally of the valve stem 13, or by placing shims between this collar and the forked portion 45 of the arm 38.

It will be observed that with this construction an elastic means is provided which will return the valve to its seat after the valve has been opened by the cam 17, the arrangement functioning similarly to the usual coiled spring. It is obvious, however, that the present construction makes it possible to increase the natural frequency of the elastic system far beyond that which is possible with a coiled spring, since the arms 38 may be made sufficiently long to afford the desired lift of the valve without unduly increasing the extent of angular displacement of the elastic shaft 25. Thus the cross-sectional area of the shaft may be relatively large or the spacing between adjacent supports relatively small to provide a very high natural frequency. Again, the amplitude of the impulses imparted to the shaft 25 are reduced by the employment of arms 38 of considerable length and thus the possibility of surging and of the development of undesired vibrations in the shaft 25 are reduced to a minimum.

For convenience in manufacture and assembly the shaft 25 is preferably integrally formed and may thus serve to effect seating of a plurality of valves. It will nevertheless be appreciated that this shaft may be formed in sections if desired, each section being allocated to one valve only. Various other alterations and modifications will occur to one skilled in the art to which the invention relates.

Having thus described the invention, what is claimed as new and desired to be secured by Letters Patent is:

1. In an internal combustion engine, the combination with a plurality of poppet valves having stems, of a shaft disposed in a plane substantially perpendicular to said valve stems and supported rigidly at spaced points on either side of each valve, and a plurality of arms, one allocated to and operatively connected with each valve stem, each arm being secured to said shaft intermediate points of support for the shaft and extending generally perpendicularly to the shaft, said shaft being torsionally stressed intermediate each arm and the adjacent points of support of the shaft to urge the arms in one direction.

2. In an internal combustion engine, the combination with a valve, of yielding means for moving said valve in one direction, said means including a substantially straight elastic shaft, means supporting said shaft against rotation at spaced points, and connections between said valve and said shaft including an arm rigidly secured to the latter intermediate said spaced points, said connections serving to torsionally stress said shaft when the said valve is open.

3. In an internal combustion engine, the combination with a poppet valve movable to and from seating position, of yielding means for moving said valve to seating position, said yielding means including an elastic shaft rigidly supported by said engine block at spaced points, and an arm secured on said shaft intermediate said points and operatively engaging said valve, said shaft being torsionally stressed to urge said arm in one direction.

4. In an internal combustion engine, the combination with a valve movable to and from seating position, of yielding means for moving said valve to seating position, said yielding means including an elastic shaft rigidly supported at spaced points by said engine block, an arm secured to said shaft intermediate the points of support therefor, and an operative connection between said arm and said valve, said shaft being torsionally stressed to urge said arm in one direction.

5. In an internal combustion engine, the combination with a valve movable to and from seating position, of yielding means for moving said valve to seating position, said yielding means including an elastic shaft rigidly supported at spaced points by said engine block, an arm secured to said shaft intermediate the points of support therefor, and a collar on said shaft, said arm having the outer end thereof forked to embrace said shaft and engage said collar, said shaft being torsionally stressed to urge said arm in one direction.

6. In an internal combustion engine, the combination with a plurality of valves, of yielding means for seating said valves, said means including a substantially straight elastic shaft loaded torsionally, and an operative connection between said shaft and each of said valves.

7. In an internal combustion engine, the combination with a plurality of valves, of yielding means for seating said valves, said means including a substantially straight elastic shaft loaded torsionally, and a plurality of arms rigid with said shaft and operatively connected with said valves.

8. In an internal combustion engine, the combination with a valve, of yielding means for moving said valve in one direction, said means including a substantially straight elastic shaft, means supporting said shaft against rotation at spaced points, and connections between said valve and said shaft intermediate said spaced points, said connections serving to torsionally stress said shaft when the said valve is open.

9. In an internal combustion engine, the combination with a poppet valve, of means including a substantially straight, metallic spring element held rigidly at spaced points, loaded in torsion and operatively connected intermediate said points with said valve to seat the latter.

HENRY KREBS.